Patented Sept. 30, 1947

2,428,282

UNITED STATES PATENT OFFICE 2,428,282

FIRE-RESISTANT LINOLEUM PRODUCT

James W. Kemmler, Yardley, Pa., assignor to Sloane-Blabon, a corporation of Delaware No Drawing. Application January 29, 1944,
Serial No. 520,356

11 Claims. (Cl. 260—23)

This invention relates to fire-resistant linoleum compositions and methods of producing the same.

Although linoleum compositions are not generally considered to be inflammable they will take fire and burn vigorously under certain conditions since the constituents used in the manufacture of linoleum floor coverings and the like are almost all of an organic nature. Moreover, after being laid, linoleum compositions are frequently polished with wax or oil, or a varnish or lacquer may be applied thereto to improve the appearance of the product and prevent marring thereof. Most of these finishes are more inflammable than the linoleum composition and increase the inflammability of the linoleum to which they are applied. This fact has given rise to restrictions in their use on ships, particularly warships, and in trains, buses, factories, apartment houses and elsewhere.

Linoleum compositions in general consist of an intimate mixture of a cement or binder and filler materials. The fillers used are usually ground cork, wood flour and the like and in some instances the pigments employed have been of an organic type. The cement or binder used in the combination has consisted of oxidized oils and fossil or oxidized resins, rosin or the like and thus practically the whole composition has been capable of combustion when once ignited.

In accordance with the present invention linoleum compositions are provided which are almost completely noninflammable and fire-resistant and far exceed the test for flammability of materials employed by the U. S. Bureau of Standards in testing asphalt tiles and similar products. Moreover, products embodying the present invention generally have a permanent wax-like appearance which renders the application of wax, oil or varnish thereto unnecessary.

A further and very important feature of the present invention resides in the fact that the length of time required for oxidation of the oils and resins used and for curing the finished product is materially shortened so that the time and cost of producing fire-resistant linoleum compositions is greatly reduced.

In accordance with the present invention these results are attained by using a suitable amount and type of chlorinated resins in the cement or binder employed in forming the composition. For best results in forming a fire-resistant floor covering, part or all of the cork and wood flour milling materials may be replaced by inorganic fillers such as asbestos, rock wool, glass wool or other inorganic short fibered materials and in some instances fillers which include or are capable of forming blanketing vapors or an inorganic flux are employed so that on fusion or heating thereof they tend to damp out the flame produced and reduce the formation of objectionable fumes.

One of the objects of the present invention is to provide a novel type of linoleum composition possessing increased fire-resistance.

Another object of the invention is to provide linoleum composition which contains a suitable amount and type of chlorinated resin to render the product extremely fire resistant.

A further object of the invention is to provide an improved fire-resistant linoleum composition which presents a surface having a wax-like finish that does not require the applications of oils or other finishes thereto.

Another object of the invention is to provide novel methods for producing linoleum compositions in which the length of time required for curing the finished product is materially reduced.

A further object of the invention is to provide a linoleum composition with a filler which includes or is capable of forming blanketing vapors or an inorganic flux which on fusion will tend to damp out flame and reduce the formation of objectionable fumes.

These and other objects and features of the present invention will appear from the following description thereof in which reference is made to particular compositions and methods for the purpose of indicating the nature and scope of the invention and not by way of limitation.

The fire-resistance test used by the United States Bureau of Standards on asphalt tiles has generally been used in conducting tests on linoleum composition hereinafter described. In accordance with this test, the flame of a three-eighths inch Bunsen burner is adjusted to shut off air completely from base thereof and the burner is adjusted to produce a yellow flame 1½ inches in length. A sample of the material to be tested is then held in the flame ¾ inch above the top of the burner for fifteen seconds. The material is considered to be fire-proof or fire-resistant if, when the sample is withdrawn from the flame, it will not continue to burn or glow more than thirty seconds.

Linoleum compositions as heretofore produced do not withstand this test and therefore are not considered fire-proof or fire-resistant as this term is used in describing and claiming the present invention.

In producing linoleum compositions heretofore it has been usual, as a first step, to oxidize oils until they form a gel of predetermined plasticity. The oils employed have been linseed oil, cottonseed oil, soya-bean oil, Perilla oil and numerous other drying or semi drying oils or mixtures thereof referred to herein and in the claims as "siccative" oils. After an oil gel of the desired plasticity has been produced resins are added to the gel and the oxidation reaction is continued for several hours and until a cement of the desired plasticity is produced. Thereafter granulated cork, wood flour, pigments or other fillers have been added to the cement and the mixture agitated or blended together in a Banbury mixer or a batch mixer to produce a linoleum composition suitable for application to a backing and capable of being cured to produce the finished product.

In accordance with the present invention oxidized oils of the character described above may be used but the resins employed are replaced entirely or in part by chlorinated resins, typical of which are chlorinated paraffins, chlorinated diphenyl, chlorinated aromatic hydrocarbons, chlorinated rubber, chlorinated rosin, and chlorinated vinyl compounds such as polyvinyl chloride or co-polymers of vinyl chloride and vinylidene chloride or vinyl acetate. Apparently any suitably chlorinated resin which is compatible with the oxidized oil may be used in the practice of the present invention.

The use of chlorinated resins renders it possible to eliminate altogether the usual step of oxidizing the resins in the presence of the oil gel and in fact such further oxidation of the gel-resin mix is undesirable since it tends to cause the cement to cure prematurely. The mixture of resins and oil gel is therefore added directly with the cork, wood flour, pigments and other filler in the Banbury or batch mixer to form a composition suitable for application to a backing.

It is believed that the chlorinated resin serves as a coagulating agent by reason of slight decomposition of unstable constituents of the resin so that the chlorine or hydrogen chloride thereof acts as a catalyst upon the oil gel in the Banbury mixer to promote polymerization of the oil and the formation of a product having the desired properties and consistency. In this way the time required for forming the cement or binder and for forming the linoleum composition itself is reduced by one-quarter to one-third.

It is further found that the action of the chlorinated resin is not limited to its coagulation of the oxidized oil in forming the uncured linoleum composition but serves also to reduce the time required to cure the product in producing a finished floor covering. This would appear to be due to the excellent solvent action of the chlorinated resins in dissolving the oil gel since the product not only cures much more rapidly than conventional linoleum compositions but also cures more uniformly and completely giving greater pliability to the product and overcoming the tendency for the composition to cure on the surface only.

The reduction in time necessary for the cure will vary with the type and amount of the chlorinated resin used and the temperature to which the material is subjected during the curing operation. Thus in one instance the time required to cure a typical floor covering at 160° F. has been reduced from nineteen days to fourteen days, whereas at 200° F. the cure time has been reduced from twelve to six days, and in another instance the time of cure has been reduced from eleven to two days.

The chlorinated resins used may vary in character and in chlorine content but in accordance with the present invention the binder should contain at least about 40% and preferably about 60% of chlorinated resin, whereas the chlorinated resin itself should contain from about 40 to 70% of chlorine. In other words the chlorine content of the cement or binder should be at least 16% and is preferably from 24% to 42%. The amount of resin used in any particular instance will depend upon the physical properties desired in the finished composition but is seldom over about 70% of the total binder since the flexibility of the composition produced is reduced when more than about 70% of highly chlorinated resin is employed. It is found that mixtures of chlorinated resins are capable of being worked more readily than when only one form of resin is employed and in the preferred practice of the invention a mixture of a resin containing about 40% chlorine with a resin containing about 70% chlorine is employed. Such mixtures are not so "short" as those in which all of the resin is highly chlorinated.

The amount of cement or binder used in linoleum products embodying the present invention is substantially the same as that employed in conventional products of the prior art, that is from about 20 to 38% of the total weight of the product.

Any desired type of filler may be used but the greatest fire resistance is obtained when using inorganic fillers. Thus although the usual cork and wood flour may be used, part or all of the fillers may be replaced by short fibered asbestos or "asbestos floats," or any other inorganic material. Usually it is preferable to use fillers of a generally fibrous material such as asbestos, rock wool, glass wool or the like. The invention further contemplates the use of fillers which include or are capable of forming blanketing vapors or a fusible inorganic flux capable of damping out flame. Typical of such fillers are antimony oxide which sublimes on heating to form a flame suppressing vapor, and flux forming agents such as commercial fritts, borax, ammonium phosphate, ammonium sulfamate, litharge, lead borate, zinc borate, lead silicate, ground quartz and compounds of lithium, barium or the like which may combine with glass or asbestos to form a flux.

The compositions and proportions of the constituents employed in any particular application of the invention may be varied considerably but in order to illustrate typical compositions and procedure embodying the present invention the following examples are cited:

*Example I*

12 parts by weight of oxidized linseed oil gel were mixed with 20 parts by weight of chlorinated diphenyl and 8 parts of 40% to 45% chlorinated paraffin. This mixture was introduced into a Banbury mixer and 18 parts of wood flour, 24 parts of granulated cork and 18 parts of pigment and inert fillers were added thereto. The mixture was worked in a Banbury mixer for four minutes until a uniform product of suitable consistency was obtained. The resulting product was then applied to a backing of burlap which previously has been fire-proofed by treatment with borax. After curing for nine days at 200° F. the product was suitably cured. A sample of the product when subjected to a test for fire-resistance, as described above, produced a flame which went out after fifteen to twenty-five seconds. The chlorinated paraffine constitutes approximately 28.5% of the chlorinated resin mixture.

In place of the chlorinated diphenyl used in this example a 70% chlorinated paraffine may be used. The chlorine content of the cement in this example, when chlorinated paraffine is used in place of the chlorinated diphenyl, is 43% to 44% by weight.

Example II

The wood flour of the composition in Example I was replaced by an equal volume of short fibered asbestos, 36 parts by weight being used, and the finished product produced in the manner described above. A sample of this product when tested as described produced a flame which was extinguished immediately upon removal from the burner flame.

Example III 37.5 parts by weight of an oil gel were mixed in a Banbury with 15 parts of mineral filler, 120 parts of asbestos, 11 parts of pigment and 37.5 parts of chlorinated diphenyl. The resulting composition was applied to a burlap backing and cured in 7 days at 200° F. This product was extinguished immediately when withdrawn from the flame after being subjected to the fire resistance test described above.

The chlorinated diphenyl in this example also may be replaced by 70% chlorinated paraffine. The chlorine content of the cement in this example is about 35% by weight.

Example IV 14 parts of oil gel were mixed with 16 parts of 70% chlorinated paraffine, 12 parts of 40% chlorinated paraffine, 68 parts of asbestos, 20 parts of mineral filler and 18 parts of pigment. The resulting blended ingredients were applied to a backing and cured in 15 days at 200° F. This product also was extinguished immediately on removal from the flame on testing thereof. The chlorine content of the cement in this example is about 38% by weight.

Example V 26 parts of oil gel were mixed with 11 parts of 70% chlorinated paraffine, 11 parts of polyvinyl chloride blended with 5 parts tricresyl phosphate, 84 parts of asbestos and 19 parts of pigment and mineral filler. This product cured in 2 days at 200° F. and was extinguished immediately on removal from the flame when tested as described.

Example VI 24 parts of oil gel and 12 parts of ester gum were treated in the conventional manner to produce a linoleum cement. This cement was then mixed in a Banbury with 15 parts of cork, 10 parts of 40% chlorinated paraffine, 15 parts of chlorinated diphenyl, 83 parts of asbestos, and 26 parts of pigment and mineral filler. The resulting product, when applied to burlap, cured in 7 days at 200° F. and when tested for fire resistance as described above the flame was extinguished in 25 seconds.

Each of the products described above presents a characteristic wax-like and wear resisting surface which is much more water repellant than that of ordinary linoleum products and as a result the application of oils, waxes, lacquers or varnish to the product is unnecessary to maintain the floor covering attractive in appearance.

In place of the chlorinated paraffine, chlorinated diphenyl and polyvinyl chloride resins used in each of the foregoing examples other resins such as chlorinated rubber, chlorinated rosin, chlorinated aromatic hydrocarbons and vinyl chloride co-polymers or the like may be used. When it is desired to cause a blanket of vapors or a flux to be formed on heating or ignition of the product the mineral fillers and pigments used may be suitably selected as described above.

The use of chlorinated resins in the product is thus seen to reduce the fire hazard very materially, whereas the usual step of oxidizing the resin and oil together may be eliminated altogether and the period of cure of the finished product is materially shortened. The resulting product therefore may be used in many places where resistance to flame is of importance and it may be produced more speedily than has been possible when producing linoleum products of the prior art.

While typical and preferred compositions and methods of procedure are described above it will be evident that many changes and modifications may be made in the composition and operations employed and the linoleum compositions produced may be used in the manufacture of floor coverings by inlaid or other methods and may be applied to any suitable or preferred form of backing material. In view thereof it should be understood that the embodiments of the invention herein described are intended to be illustrative only and are not intended to limit the scope of the following claims.

I claim:

1. A linoleum composition embodying a filler and a cement, the cement constituting from 20% to 38% by weight of the composition and containing oxidized and gelled siccative oil together with from 40% to 70% of chlorinated resin containing from 40% to 70% of chlorine, said chlorinated resin including at least 28.5% chlorinated paraffine, the filler being composed substantially entirely of inorganic materials, the composition being characterized by the fact that it will not continue to burn or glow more than 30 seconds after being withdrawn from the flame of a Bunsen burner in which it has been held for a period of 15 seconds.

2. A linoleum composition embodying a filler and a cement, the cement constituting from 20% to 38% by weight of the composition and containing oxidized and gelled siccative oil together with from 40% to 70% of chlorinated resin containing from 40% to 70% of chlorine at least 28.5% of the chlorinated resin being chlorinated paraffine and the total chlorine content of the cement being from 24% to 42%, at least the major part of said filler being inorganic and a part of said inorganic filler being asbestos, said composition being characterized by the fact that it will not burn or glow for more than 30 seconds after being withdrawn from the flame of a Bunsen burner in which it has been held for a period of 15 seconds.

3. A linoleum composition embodying a filler and a cement, the cement constituting from 20% to 38% by weight of the composition and containing oxidized and gelled siccative oil together with from 40% to 70% of chlorinated resin containing from 40% to 70% of chlorine, said chlorinated resin including at least 28.5% chlorinated paraffine, the filler being a mixture of organic and inorganic fillers in which the weight of the inorganic filler is greater than the weight of the organic filler, the composition being characterized by the fact that it will not continue to burn or glow more than 30 seconds after being withdrawn from the flame of a Bunsen burner in which it has been held for a period of 15 seconds.

4. A linoleum composition embodying a filler and a cement, the cement constituting from 20% to 38% by weight of the composition and containing oxidized and gelled siccative oil together with from 40% to 70% chlorinated resin containing from 40% to 70% of chlorine, at least 28.5% of the chlorinated resin being chlorinated paraffine, said composition being characterized by the fact that it will not continue to burn or glow for more than 30 seconds after being withdrawn from the flame of a Bunsen burner in which it has been held for a period of 15 seconds.

5. A linoleum composition embodying a filler and a cement, the cement constituting from 20% to 38% by weight of the composition and containing oxidized and gelled siccative oil together with from 40% to 70% of chlorinated resin containing from 40% to 70% of chlorine, at least 28.5% of the chlorinated resin being chlorinated paraffine, said filler material including constituents which on heating fuse to form a fire dampening flux, said composition being characterized by the fact that it will not continue to burn or glow for more than 30 seconds after being withdrawn from the flame of a Bunsen burner in which it has been held for a period of 15 seconds.

6. A linoleum composition embodying a filler and a cement, the cement constituting from 20% to 38% by weight of the composition and containing oxidized and gelled siccative oil together with from 40% to 70% of chlorinated resin containing from 40% to 70% of chlorine, said chlorinated resin including at least 28.5% chlorinated paraffine, said composition being characterized by the fact that it will not continue to burn or glow for more than 30 seconds after being withdrawn from the flame of a Bunsen burner in which it has been held for a period of 15 seconds.

7. A linoleum composition embodying a filler and a cement, the cement constituting from 20% to 38% by weight of the composition and containing oxidized and gelled siccative oil together with from 40% to 70% by weight of a mixture of two differently chlorinated resins each of which resins contains from 40% to 70% of chlorine, both of said chlorinated resins being chlorinated paraffine, the filler consisting substantially entirely of inorganic material and the composition being characterized by the fact that it will not continue to burn or glow for more than 30 seconds after being withdrawn from the flame of a Bunsen burner in which it has been held for a period of 15 seconds.

8. A linoleum composition embodying a filler and a cement, the cement constituting from 20% to 38% by weight of the composition and containing oxidized and gelled siccative oil together with from 40% to 70% by weight of a mixture of two differently chlorinated resins each of which resins contains from 40% to 70% of chlorine, both of said chlorinated resins being chlorinated paraffine, said composition being characterized by the fact that it will not continue to burn or glow for more than 30 seconds after being withdrawn from the flame of a Bunsen burner in which it has been held for a period of 15 seconds.

9. A linoleum composition embodying a filler and a cement, the cement constituting from 20% to 38% by weight of the composition and containing oxidized and gelled siccative oil together with from 40% to 70% by weight of a mixture of differently chlorinated resins one of which resins is chlorinated paraffine containing 40% of chlorine and another is chlorinated paraffine containing 70% of chlorine, the filler consisting substantially entirely of inorganic material and said composition being characterized by the fact that it will not continue to burn or glow for more than 30 seconds after being withdrawn from the flame of a Bunsen burner in which it has been held for a period of 15 seconds.

10. A fire-resistant linoleum composition comprising 26 parts of oxidized and gelled siccative oil, 11 parts of 70% chlorinated paraffine, 11 parts of polyvinyl chloride blended with 5 parts of tricresyl phosphate, 84 parts of asbestos and 19 parts of mineral filler and pigment.

11. A fire-resistant linoleum composition comprising about 26 parts of oxidized oil gel, 11 parts of 70% chlorinated paraffine, 11 parts of polyvinyl chloride blended with 5 parts of tricresyl phosphate, 84 parts of asbestos and 19 parts of mineral filler and pigment.

JAMES W. KEMMLER.

REFERENCES CITED

The following references are of record in the file of this patent:

UNITED STATES PATENTS

| Number | Name | Date |
|---|---|---|
| 1,831,707 | Gardner | Nov. 10, 1931 |
| 2,300,193 | Allen | Oct. 27, 1942 |
| 2,124,288 | Dodd | July 19, 1938 |
| 2,174,164 | Pellerano | Sept. 26, 1939 |
| 2,335,097 | Aken | Nov. 23, 1943 |